United States Patent
Koguchi

(10) Patent No.: US 7,529,260 B2
(45) Date of Patent: May 5, 2009

(54) PACKET TRANSMISSION APPARATUS, PACKET TRANSMISSION SYSTEM AND PACKET TRANSMISSION METHOD

(75) Inventor: Hiroshi Koguchi, Kanagawa (JP)

(73) Assignee: Kabushiki Kaisha Toshiba (JP)

( * ) Notice: Subject to any disclaimer, the term of this patent is extended or adjusted under 35 U.S.C. 154(b) by 798 days.

(21) Appl. No.: 11/096,762

(22) Filed: Mar. 31, 2005

(65) Prior Publication Data

US 2005/0243866 A1    Nov. 3, 2005

(30) Foreign Application Priority Data

Apr. 14, 2004    (JP)    ............... 2004-118846

(51) Int. Cl.
*H04L 12/56* (2006.01)
(52) U.S. Cl. .................. 370/412; 370/252; 370/474
(58) Field of Classification Search ................ 370/412, 370/474, 229, 230, 230.1, 235, 252, 253
See application file for complete search history.

(56) References Cited

U.S. PATENT DOCUMENTS

| | | | |
|---|---|---|---|
| 5,706,439 A | 1/1998 | Parker | |
| 6,128,715 A | 10/2000 | Wang et al. | |
| 6,185,607 B1 * | 2/2001 | Lo et al. | 709/213 |
| 6,700,887 B1 * | 3/2004 | Tsujimoto | 370/389 |
| 7,107,375 B2 * | 9/2006 | Ward et al. | 710/107 |
| 2002/0150114 A1 * | 10/2002 | Sainomoto et al. | 370/402 |
| 2002/0161978 A1 * | 10/2002 | Apostol et al. | 711/151 |
| 2003/0188054 A1 * | 10/2003 | Yosimoto et al. | 710/22 |
| 2005/0188123 A1 * | 8/2005 | Chen | 710/33 |

FOREIGN PATENT DOCUMENTS

| | | |
|---|---|---|
| JP | 2000-151619 | 5/2000 |
| JP | 2000-307611 | 11/2000 |

OTHER PUBLICATIONS

Japanese Office Action (Japanese and English language) dated May 9, 2008 corresponding to the related Japanese Patent Application No. 118846/2004.

* cited by examiner

*Primary Examiner*—Ricky Ngo
*Assistant Examiner*—Gary Mui
(74) *Attorney, Agent, or Firm*—DLA Piper LLP (US)

(57) ABSTRACT

There is provided a packet transmission apparatus, system and method that are implemented in an apparatus generating a packet to send out packet generated toward another device via a network bus, including: generating a first packet having a first header and contents data; inputting a data string of the first packet to a buffer from its head successively; determining whether the network bus is available in case where a predetermined data sending condition is satisfied; reading out contents data that is input to the buffer and that is not yet read out from the buffer, in case where the network bus is available; generating a second header on the basis of a size of the contents data read out and the first header; adding the second header to the contents data read out to generate a second packet; and outputting the generated second packet to the network bus.

13 Claims, 7 Drawing Sheets

PACKET TRANSMISSION APPARATUS, PACKET TRANSMISSION SYSTEM AND PACKET TRANSMISSION METHOD

CROSS-REFERENCE TO RELATED APPLICATIONS

This application claims the benefit of priority under 35USC §119 to Japanese Patent Application No. 2004-118846 filed on Apr. 14, 2004, the entire contents of which are incorporated herein by reference.

BACKGROUND OF THE INVENTION

1. Field of the Invention

The present invention relates to a packet transmission apparatus, a packet transmission system and a packet transmission method used in an apparatus having, for example, an IEEE 1394 serial interface.

2. Related Background Art

When sending out a packet, a conventional transmission apparatus first reads in a packet to be transmitted via a CPU bus by a PIO (Programmed I/O) or a DMA (Direct Memory Access), and writes the packet into a inside storage unit such as a FIFO (First In First Out) (packet preparation operation). If the packet preparation operation is completed, the transmission apparatus sends a transmission request onto an IEEE 1394 bus (network bus). Upon acquiring a transmission permission (transmission right) from a bus manager connected to the IEEE 1394 bus, the transmission apparatus outputs a packet stored in the storage unit onto the IEEE 1394 bus. In other words, the transmission apparatus transmits the packet to a transmission destination.

As heretofore described, the transmission apparatus starts packet transmission after the packet preparation operation is completed. When the size of the packet to be transmitted is large, therefore, it takes a long time for the above-described packet preparation operation. This results in a problem of delayed completion of data transmission.

Furthermore, if the size of the packet to be transmitted is large, the time over which the transmission apparatus continuously occupies the IEEE 1394 bus becomes long. While the transmission is being conducted, another IEEE 1394 device cannot conduct data transmission. Even if another device is to transmit a small amount of data, therefore, it must wait for transmission for a long time. As a result, transmission of a packet having a large size becomes a cause of lowering the transmission efficiency by another IEEE 1394 device.

SUMMARY OF THE INVENTION

Figure 1:
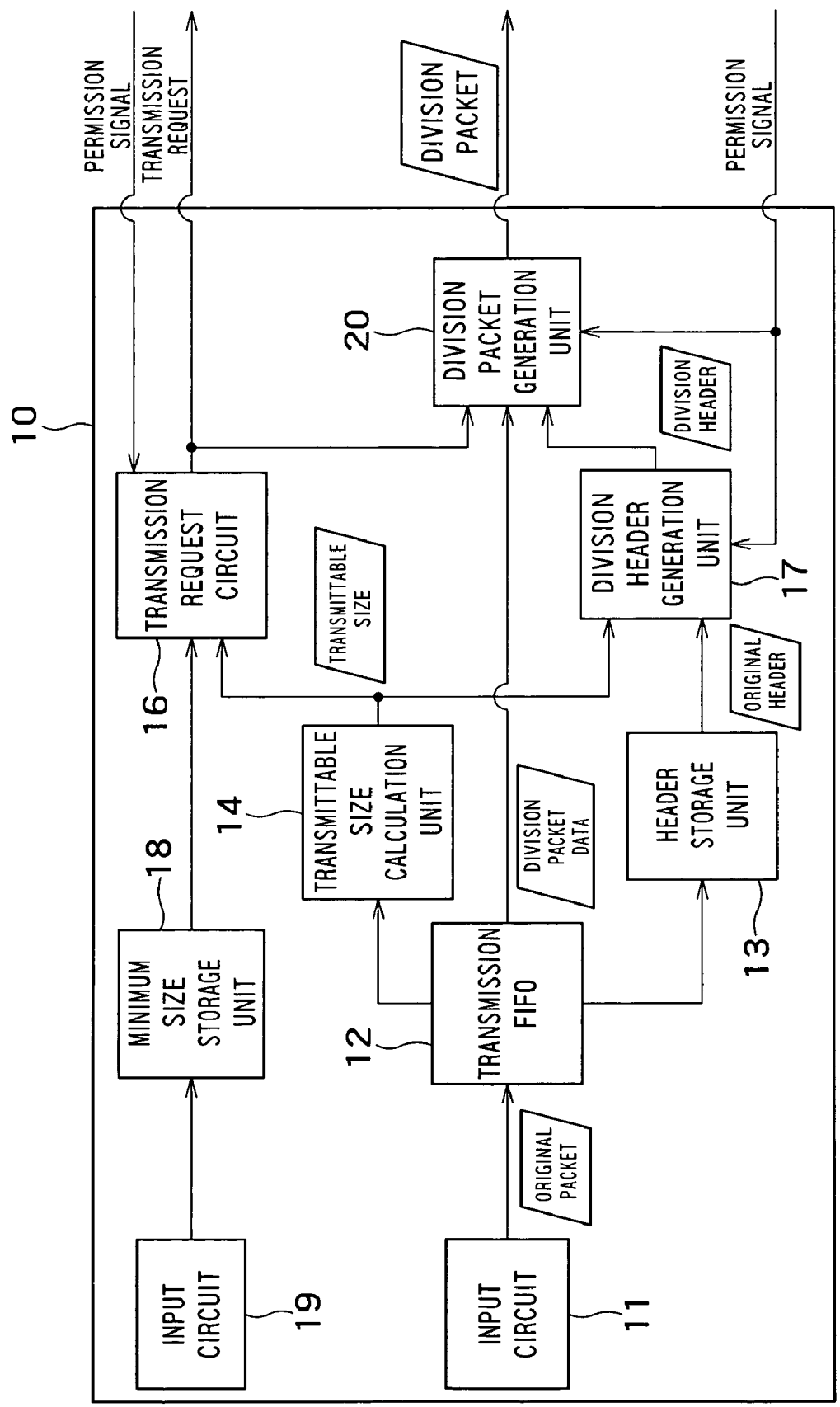
FIG. 1 is a block diagram schematically showing a configuration of a packet transmission apparatus according to a first embodiment of the present invention.

According to an aspect of the present invention, there is provided a packet transmission apparatus mounted on a packet generating apparatus, for sending out packet generated toward another device via a network bus, the packet transmission apparatus comprising: a buffer into which a data string of a first packet having a first header and contents data is input; a condition storage unit which stores a predetermined data sending condition; a decision unit which makes a decision whether the network bus is available in case where the predetermined data sending condition is satisfied; a data readout unit which reads out contents data that is input to the buffer and that is not yet read out from the buffer, from the buffer, in case where the network bus is available; a header generation unit which generates a second header on the basis of a size of the contents data read out and the first header; a packet generation unit which adds the second header to the contents data read out to generate a second packet; and a packet output unit which outputs the second packet to the network bus.

According to an aspect of the present invention, there is provided a packet transmission system, comprising: a CPU which generates a packet; a memory apparatus which stores the generated packet; and a packet transmission apparatus which transmits the generated packet to another device via a network bus, the CPU, the memory apparatus and the packet transmission apparatus being connected to a CPU bus, wherein the CPU generates a first packet having a first header and contents data, and stores the first packet in the memory apparatus, and the packet transmission apparatus comprises: a packet reception unit which receives the first packet from the CPU bus; a buffer into which a data string of the first packet from the CPU bus is input; a condition storage unit which stores a predetermined data sending condition; a decision unit which makes a decision whether the network bus is available in case where the data sending condition is satisfied; a data readout unit which reads out contents data that is input to the buffer and that is not yet read out from the buffer, from the buffer, in case where the network bus is available; a header generation unit which generates a second header on the basis of a size of the contents data read out and the first header; a packet generation unit which adds the second header to the contents data read out to generate a second packet; and a packet output unit which outputs the second packet to the network bus.

According to an aspect of the present invention, there is provided a packet transmission method of generating a packet in a certain device connected to a network bus and sending out the generated packet toward another device, the packet transmission method comprising: generating a first packet having a first header and contents data; inputting a data string of the first packet to a buffer from its head successively; making a decision whether the network bus is available in case where a predetermined data sending condition is satisfied; reading out contents data that is input to the buffer and that is not yet read out from the buffer, from the buffer, in case where the network bus is available; generating a second header on the basis of a size of the contents data read out and the first header; adding the second header to the contents data read out to generate a second packet; and outputting the generated second packet to the network bus.

DETAILED DESCRIPTION OF THE INVENTION

FIG. 1 is a block diagram schematically showing a configuration of a packet transmission apparatus 10 according to a first embodiment of the present invention.

The packet transmission apparatus 10 is included in, for example, an apparatus having an IEEE 1394 serial interface to execute the so-called asynchronous transfer with another device connected to the same IEEE 1394 bus (network bus).

Figure 2:
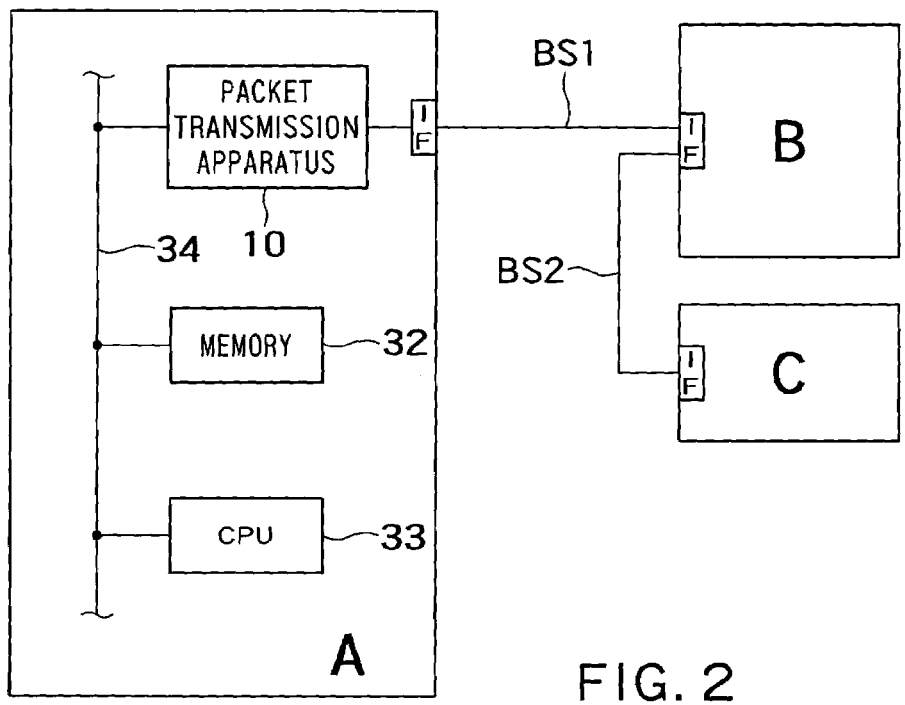
FIG. 2 is a diagram showing a state in which three terminals each having an IEEE 1394 serial interface are serially connected respectively by IEEE 1394 buses.

FIG. 2 is a diagram showing a state in which terminals A, B and C each having an IEEE 1394 serial interface are serially connected by IEEE 1394 buses (cables) BS1 and BS2.

The terminal (packet transmission system) A includes a packet transmission apparatus 10 shown in FIG. 1. The packet transmission apparatus 10 is connected to the same CPU bus 34 together with a memory 32 and a CPU 33. The CPU 33 generates a packet to be transmitted by the packet transmission apparatus 10, and stores the packet in the memory 32. The terminal C has been selected as a bus manager which manages the use right of the network bus. When the terminal A transmits a packet to the terminal B, the terminal A reads in the packet from memory 32 and stores the read packed into a inside FIFO. The packet transmission apparatus 10 outputs a transmission request signal to the terminal C serving as the bus manager. The transmission request signal corresponds to, for example, a bus use request signal. Upon receiving a bus use permission signal (upon acquiring bus use right) from the terminal C, the packet transmission apparatus 10 reads out the packet from the FIFO, and outputs the packet to the terminal B onto the IEEE 1394 bus BS1.

Hereafter, the packet transmission apparatus 10 will be described in detail with reference to FIG. 1.

As shown in FIG. 1, an input circuit 11 receives an asynchronous packet from the CPU 33 (see FIG. 2), i.e., a register, and inputs the received asynchronous packet to a transmission FIFO 12 as an original packet. In other words, the input circuit 11 successively inputs a bit data string of the asynchronous packet to the transmission FIFO 12 from the head of the bit data string.

Figure 3:
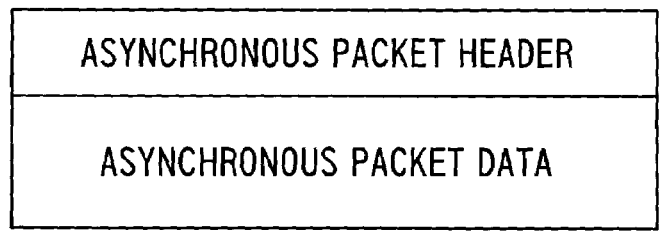
FIG. 3 is a diagram schematically showing a structure example of an asynchronous packet.

FIG. 3 is a diagram schematically showing a structure example of an asynchronous packet.

As shown in FIG. 3, the asynchronous packet includes an asynchronous packet header (hereafter referred to as asynchronous header) and asynchronous packet data (hereafter referred to as asynchronous data or payload part). The asynchronous header includes an address (node ID) of transmission destination, a data size of the asynchronous data or asynchronous packet, and a head address for writing the asynchronous packet at the transmission destination. On the other hand, the asynchronous data includes, for example, document data having no real time property.

Referring back to FIG. 1, the transmission FIFO 12 separates the asynchronous header from the input original packet, and outputs the asynchronous header to a header storage unit 13.

On the other hand, the transmission FIFO 12 outputs information (a read pointer and a write pointer) for calculating the data size of the input asynchronous data, i.e., the data size (transmittable size) of asynchronous data that is input to the transmission FIFO 12 and that is not yet read from the transmission FIFO 12, to a transmittable size calculation unit 14.

Figure 4:
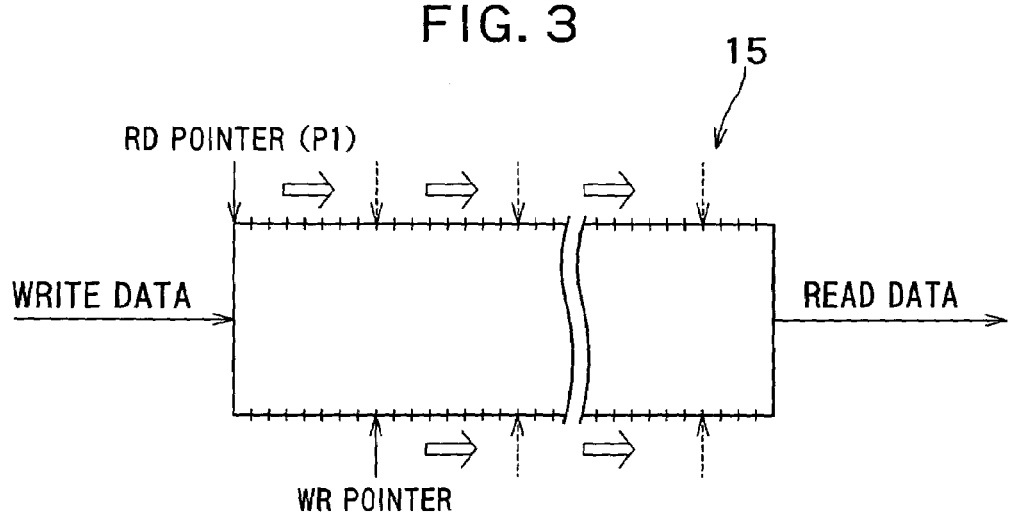
FIG. 4 is a diagram schematically showing a portion that stores asynchronous data in a transmission FIFO.

FIG. 4 is a diagram schematically showing a portion (data storage unit) 15 that stores asynchronous data in the transmission FIFO 12.

As shown in FIG. 4, a read pointer (RD pointer) and a write pointer (WR pointer) are set in the data storage unit 15. Each time asynchronous data is written, the value indicated by the WR pointer increases. On the other hand, when the asynchronous data is read out, the value indicated by the RD pointer increases accordingly.

At first, asynchronous data is written into the data storage unit 15 (the asynchronous data is not yet read out). Therefore, the value indicated by the WR pointer successively rises, but the value indicated by the RD pointer remains to be fixed to a position P1 which indicates a head bit (or a head block (one block has a plurality of bits)) of the asynchronous data.

As described above, the transmission FIFO 12 outputs values of the RD pointer and the WR pointer to the transmittable size calculation unit 14.

The transmittable size calculation unit 14 calculates the data size (transmittable size) of the asynchronous data that is input to the transmission FIFO 12 and that is not yet read, on the basis of the received values of the RD pointer and the WR pointer. Specifically, the transmittable size calculation unit 14 calculates the transmittable size by calculating "the value of the WR pointer—the value of the RD pointer."

In other words, the asynchronous header is first input to the transmission FIFO 12, and then a data string of the asynchronous data are input to the transmission FIFO 12 successively from its head bit to its tail bit. Each time a bit in the asynchronous data is input to the transmission FIFO 12 (or data corresponding to one word is input to the transmission FIFO 12), the transmittable size calculation unit 14 calculates the transmittable size (for example, in bit unit or word unit).

Each time the transmittable size calculation unit 14 calculates the transmittable size, it outputs the calculated transmittable size to a transmission request circuit 16 and a division header generation unit 17.

The transmission request circuit 16 compares the input transmittable size with a minimum size (threshold size) stored in a minimum size storage unit (condition storage unit) 18. The minimum size is received from the CPU 33 (see FIG. 2) by an input circuit 19 and input to the minimum size storage unit 18.

If as a result of the comparison the transmittable size reaches at least the minimum size, the transmission request circuit 16 sends out a transmission request signal to the bus manager (see the terminal C in FIG. 2) and a division packet generation unit 20. The transmission request circuit 16 sends out the transmission request signal until it receives transmission permission from the bus manager. Upon receiving a transmission permission signal from the bus manager, the transmission request circuit 16 stops the generation of the transmission request signal. The transmission permission signal is input to the division packet generation unit 20 and the division header generation unit 17 as well.

Upon receiving the transmission permission signal from the bus manager, the division header generation unit 17 acquires the asynchronous header from the header storage unit 13 as an original header. Each time the transmittable size is calculated by the transmittable size calculation unit 14, the transmittable size is input to the division header generation unit 17 as described above. The division header generation unit 17 determines the size of asynchronous data to be transmitted to the transmission destination on the basis of the transmittable size input until the current time. For example, the division header generation unit 17 determines the transmittable size (maximum size) acquired lastly as the size of asynchronous data to be transmitted. In other words, the division header generation unit 17 determines the size of asynchronous data that is input to the transmission FIFO 12 and that is not yet read out. The division header generation unit 17 rewrites the data size etc. in the acquired original header on the basis of the determined size of the asynchronous data to be transmitted (≦data size in the original header), and generates a new header (division header). If the data size in the original header indicates the data size of the payload part in the packet, the data size in the division header becomes the determined size of asynchronous data to be transmitted. The division header generation unit 17 outputs the generated division header to the division packet generation unit 20.

The division packet generation unit 20 reads out asynchronous data from the transmission FIFO 12 as division data on the basis of the data size in the input division header. If the data size in the division header indicates the data size of the payload part, the division packet generation unit 20 reads out asynchronous data corresponding to the data size from the position of the RD pointer in the transmission FIFO 12. The transmission FIFO 12 increases the value of the RD pointer by the size of the data read out (see FIG. 4). The division packet generation unit 20 adds the input division header to the division data read out, and thereby generates a new packet (division packet). The division packet generation unit 20 outputs the generated division packet onto the IEEE 1394 bus BS1 (see FIG. 2). In other words, the division packet generation unit 20 sends out the generated division packet to the transmission destination. Upon sending out the division packet, the division packet generation unit 20 outputs a sending completion signal (not illustrated) to the transmission request circuit 16. Upon receiving the sending completion signal, the transmission request circuit 16 is brought into a state in which the transmission request signal can be generated again.

Thereafter, by repeating the processing heretofore described, sending out one asynchronous packet is finished.

In other words, thereafter, the transmittable size calculation unit 14 calculates the transmittable size based on the new value of the RD pointer and the input value of the WR pointer. The transmittable size calculation unit 14 outputs the calculated transmittable size to the transmission request circuit 16 and the division header generation unit 17.

If the transmittable size has reached at least the minimum size, the transmission request circuit 16 sends out the transmission request signal to the bus manager (see FIG. 2) and the division packet generation unit 20. Or if the transmittable size is less than the minimum size, but the input transmittable size has become fixed (inputting of asynchronous data into the transmission FIFO 12 is finished), the transmission request circuit 16 transmits the transmission request signal in the same way.

If the transmission permission signal is input from the bus manager, the division header generation unit 17 determines the size of asynchronous data to be transmitted, on the basis of the transmittable size supplied from the transmittable size calculation unit 14. The division header generation unit 17 rewrites the data size in the original header on the basis of the determined size, and generates a division header. The division header generation unit 17 outputs the generated division header to the division packet generation unit 20.

The division packet generation unit 20 reads out asynchronous data from the transmission FIFO 12 on the basis of the data size in the input division header. In other words, the division packet generation unit 20 reads out asynchronous data, based on the determined size from the position of the new RD pointer. The division packet generation unit 20 adds the division header to the asynchronous data (division data) read out, thereby generates a division packet, and sends out the generated division packet to the transmission destination. The transmission FIFO 12 advances the position in the RD pointer by the size of the data read out. Thereafter, the processing heretofore described is repeated in the same way.

Effects brought about by the present embodiment will now be described.

Figure 5:
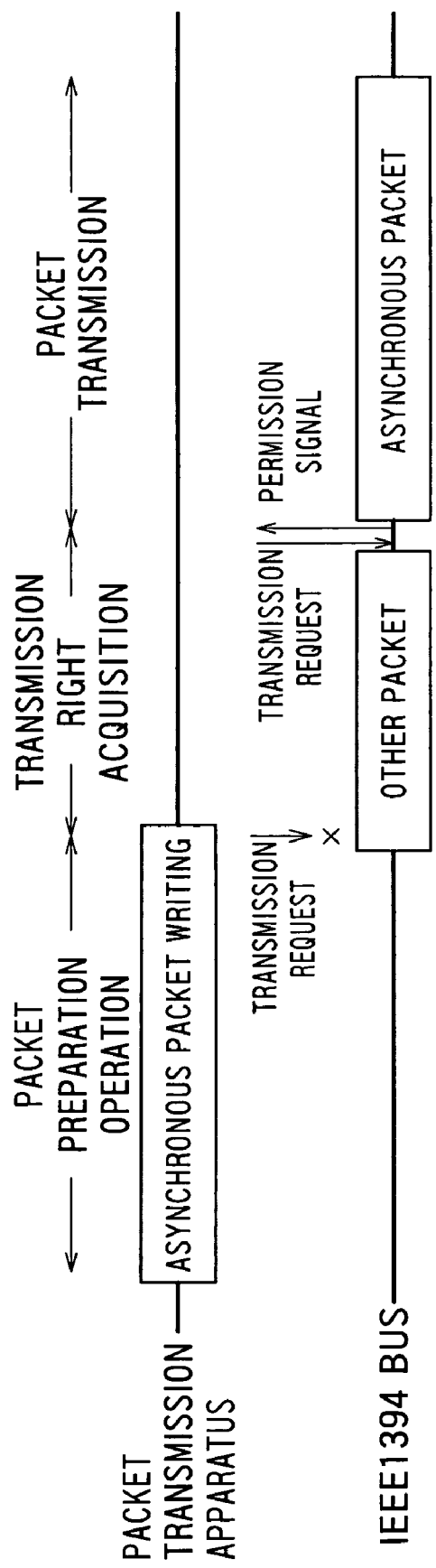
FIG. 5 is a diagram showing a transmission procedure of asynchronous data, by a packet transmission apparatus that has been implemented before the present inventor achieves the present invention.

FIG. 5 is a diagram showing a conventional transmission procedure of asynchronous packets, by a packet transmission apparatus that has been implemented before the present inventor achieves the present invention.

In this transmission procedure, the packet transmission apparatus outputs a transmission request signal directed to the bus manager to the IEEE 1394 bus after the writing of the asynchronous packet into the transmission FIFO is completed. Upon obtaining the transmission permission, the packet transmission apparatus sends out the asynchronous packet in the transmission FIFO to the transmission destination. In the scheme in which transmission is started after the asynchronous packet writing is completed, there is a problem of delayed completion of the data transmission. For example, as shown in FIG. 5, a first transmission request is rejected by the bus manager because other packets are flowing on the IEEE 1394 bus. Transmission permission is obtained in response to a second transmission request. In such a case, completion of the data transmission is delayed.

Figure 6:
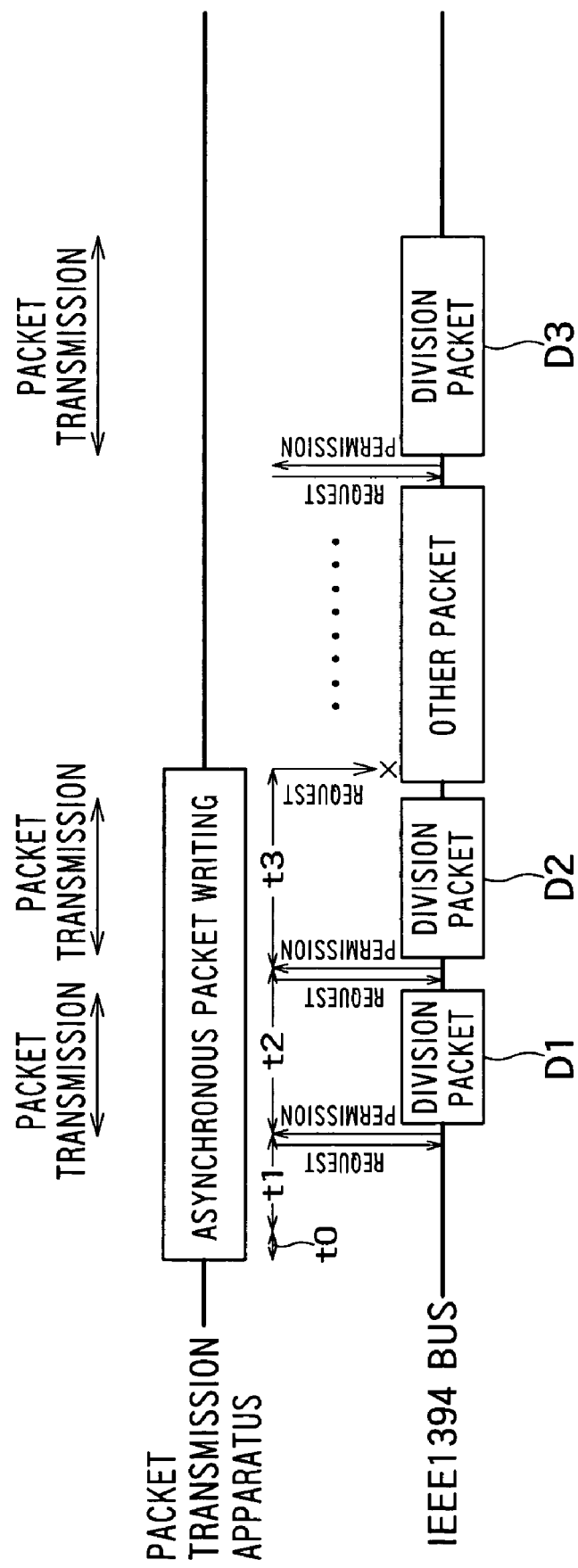
FIG. 6 is a diagram showing a transmission procedure of asynchronous data according to the present embodiment.

FIG. 6 is a diagram showing a transmission procedure of asynchronous data according to the present embodiment.

A time interval t0 is an asynchronous header writing time interval. Time intervals t1 to t3 are asynchronous data (divided data) writing time intervals. Division packets D1 to D3 correspond to asynchronous data written in the time intervals t1 to t3, respectively.

As shown in FIG. 6, the packet transmission apparatus outputs a transmission request signal to the bus manager at time when data of the minimum size (set size) is stored in the transmission FIFO (for example, in the middle of the time interval t1). Upon obtaining transmission permission, the packet transmission apparatus transmits asynchronous data stored until current time (time when the time interval t1 has finished). In other words, even if asynchronous data writing is under way, data is transmitted, provided that the IEEE 1394 bus is available (in the idle state). Therefore, the IEEE 1394 bus can be used efficiently, and transmission of asynchronous data is also completed early.

In the packet transmission apparatus 10 heretofore described (see FIG. 1), the input circuit 11 which inputs an asynchronous packet to the transmission FIFO 12 acquires the asynchronous packet from the CPU 33. In other words, the input circuit 11 acquires an asynchronous packet in accordance with the (Programmed I/O) scheme in which the CPU 33 manages the data transfer in the memory 32 (see FIG. 2).

Figure 7:
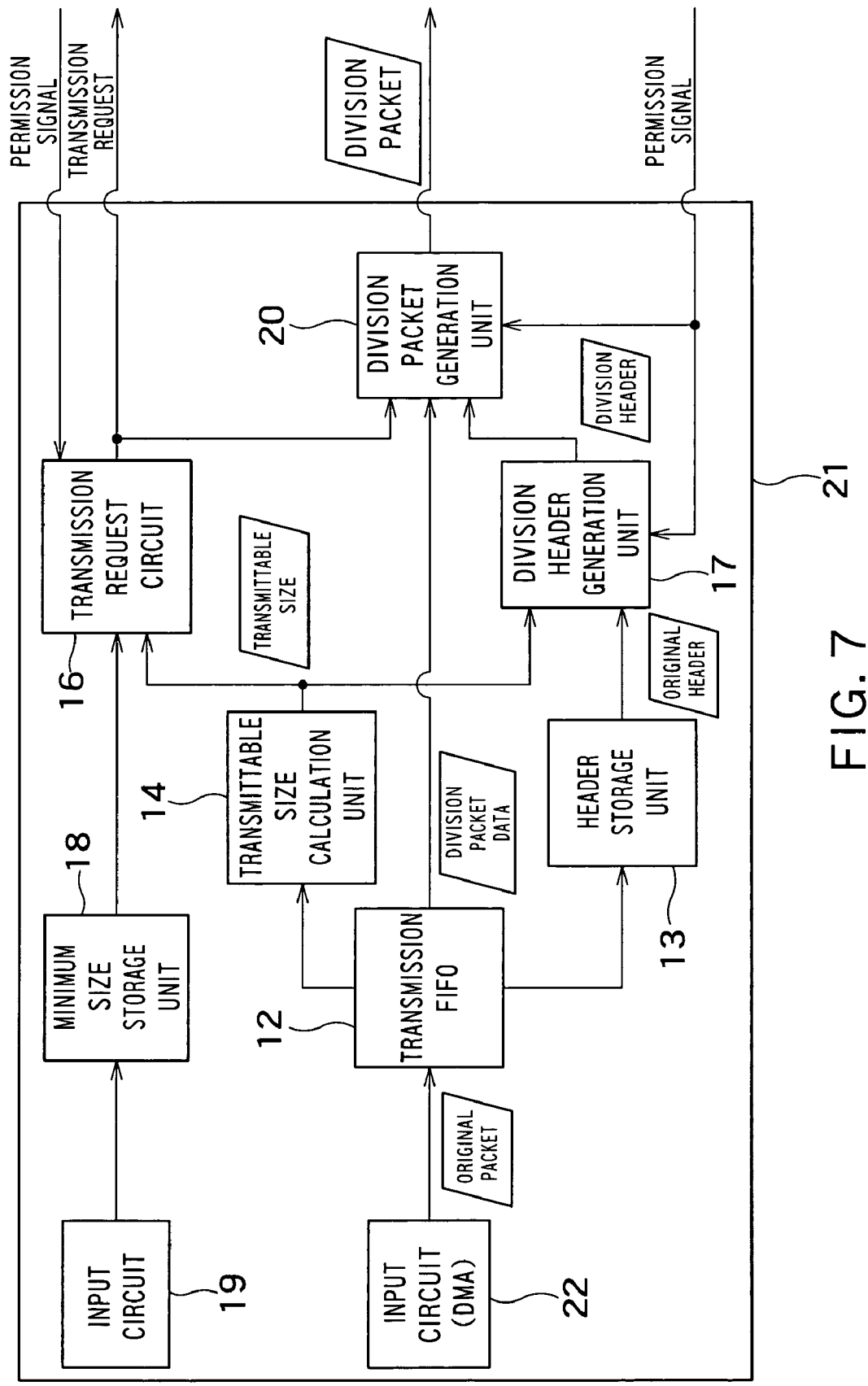
FIG. 7 is a diagram showing a modification example of a packet transmission apparatus shown in FIG. 1.

Alternatively, as shown in FIG. 7 which shows another example of the packet transmission apparatus (a packet transmission apparatus 21), an input circuit 22 of the (Direct Memory Access) scheme may be used and the input circuit 22 may acquire an asynchronous packet directly from the memory 32. This brings about an effect of lightening the load of the CPU 33.

According to the present embodiment, data transmission is executed as heretofore described if asynchronous data corresponding to at least the minimum size is stored in the transmission FIFO and the network bus is in the idle state even when the storage of the asynchronous data is not completed. Therefore, the data transmission may be completed early.

Furthermore, since the transmission data is divided into small parts, the network bus is not occupied continuously for a long time. Therefore, it is possible to prevent some terminal from being kept waiting for a long time to send out a small amount of data.

Figure 8:
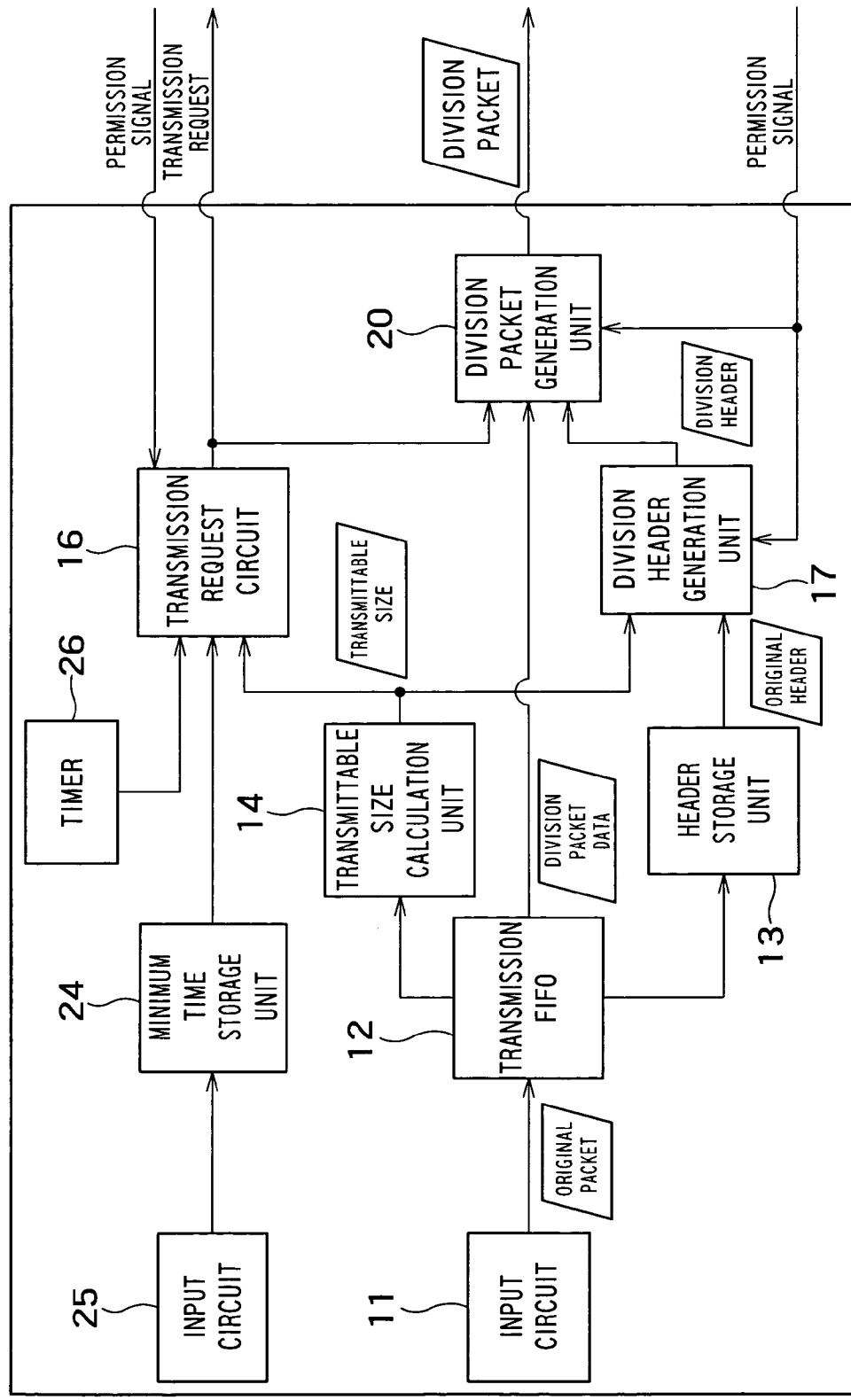
FIG. 8 is a block diagram schematically showing a configuration of a packet transmission apparatus according to a second embodiment of the present invention.
Figure 9:
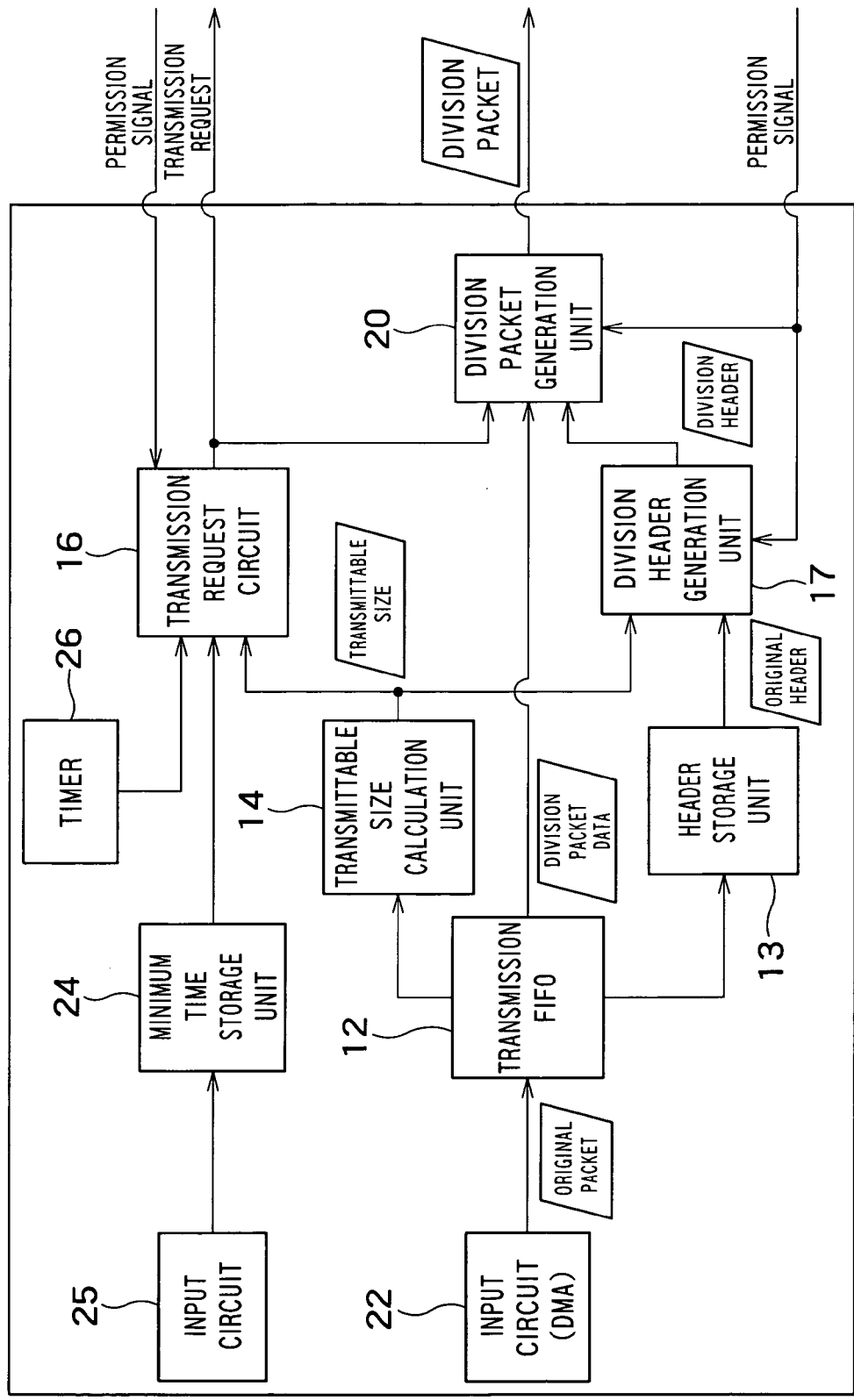
FIG. 9 is a diagram showing a modification example of the packet transmission apparatus shown in FIG. 8.

FIG. 8 is a block diagram schematically showing a configuration of a packet transmission apparatus 23 according to a second embodiment of the present invention.

In the above-described first embodiment, the transmission request signal is sent out to the bus manager when asynchronous data of at least the minimum size has been stored in the transmission FIFO 12. In the present embodiment, however, the transmission request signal is sent out to the bus manager each time a minimum time elapses. Hereafter, the present embodiment will be described in detail.

With reference to FIG. 8, a minimum time (threshold time) is stored in a minimum time storage unit (condition storage unit) 24. An input circuit 25 receives the minimum time from, for example, the CPU 33, and stores it in the minimum time storage unit 24.

The transmission request circuit 16 measures time indicated by the minimum time on the basis of the timer 26. When the minimum time has elapsed, the transmission request circuit 16 sends out the transmission request signal to the bus manager. If asynchronous data is not present in the transmission FIFO 12 (for example, if the transmittable size input from the transmittable size calculation unit 14 is zero), however, the transmission request circuit may not send out the transmission request signal.

By thus sending out the transmission request signal every minimum time, the data transmission can be completed earlier. If the transmission request signal is sent out when data of at least the minimum size is stored as in the first embodiment, it is possible that the network bus is in the use state when sending out the transmission request signal. On the other hand, in the present embodiment, the transmission request signal is sent out every minimum time, and data transmission is conducted in the case where the transmission is possible. Therefore, the network bus in the idle state can be used more effectively. As a result, early completion of the data transmission can be anticipated.

In FIG. 8, the input circuit 11 acquires an asynchronous packet from the CPU 33 and inputs it to the transmission FIFO 12. Alternatively, it is also possible to use an input circuit of the DMA scheme and acquire the asynchronous packet directly from the memory 32. As a result, the load of the CPU 33 can be lightened.

What is claimed is:

1. A packet transmission apparatus mounted on a packet generating apparatus, for sending out packet generated toward another device via a network bus, packet transmission apparatus comprising:
    a buffer into which a data string of a first packet having a first header and contents data is input and which alters a value of a write pointer according to an input of the contents data and alters a value of a read pointer according to an output of the contents data;
    a condition storage unit which stores a threshold size as a predetermined data sending condition;
    a transmittable size calculation unit which calculates a size of contents data that is input to the buffer and that is not yet read out from the buffer by subtracting the value of the read pointer from the value of the write pointer, as a transmittable size;
    a decision unit which makes a decision whether the network bus is available in case where the transmittable size has reached at least the threshold size;
    a data readout unit which reads out contents data that is input to the buffer and that is not yet read out from the buffer, in case where the network bus is available;
    a header generation unit which generates a second header on the basis of a size of the contents data read out and the first header;
    a packet generation unit which adds the second header to the contents data read out to generate a second packet; and
    a packet output unit which outputs the second packet to the network bus.

2. The packet transmission apparatus according to claim 1, wherein the decision unit outputs a bus use request signal to the network bus to request use of the network bus, and
    in case where a bus use permission signal is input from the network bus, the decision unit determines that the network bus is available.

3. The packet transmission apparatus according to claim 1, wherein in case where a value of the transmittable size becomes constant, the decision unit makes a decision whether the network bus is available, even though the transmittable size is less than the threshold size.

4. The packet transmission, apparatus according to claim 1, wherein
    the first header contains a size of contents data included in the first packet, and
    the second header contains a size of contents data included in the second packet.

5. The packet transmission apparatus according to claim 1, wherein each of the first and second packets is an asynchronous packet according to the IEEE 1394 standards.

6. The packet transmission apparatus according to claim 5, wherein the asynchronous packet contains non-real-time data as the contents data.

7. A packet transmission system, comprising:
    a CPU which generates a packet;
    a memory apparatus which stores the generated packet; and
    a packet transmission apparatus which transmits the generated packet to another device via a network bus, the CPU, the memory apparatus and the packet transmission apparatus being connected to a CPU bus,
    wherein
    the CPU generates a first packet having a first header and contents data, and stores the first packet in the memory apparatus, and
    the packet transmission apparatus comprises:
    a packet reception unit which receives the first packet from the CPU bus;
    a buffer into which a data string of the first packet from the CPU bus is input and which alters a value of a write pointer according to an input of the contents data and alters a value of a read pointer according to an output of the contents data;
    a condition storage unit which stores a threshold size as a predetermined data sending condition;
    a transmittable size calculation unit which calculates a size of contents data that is input to the buffer and that is not yet read out from the buffer by subtracting the value of the read pointer from the value of the write pointer, as a transmittable size;
    a decision unit which makes a decision whether the network bus is available in case where the transmittable size has reached at least the threshold size;
    a data readout unit which reads out contents data that is input to the buffer and that is not yet read out from the buffer, in case where the network bus is available;

a header generation unit which generates a second header on the basis of a size of the contents data read out and the first header;

a packet generation unit which adds the second header to the contents data read out to generate a second packet; and a packet output unit which outputs the second packet to the network bus.

8. The packet transmission system according to claim 7, wherein the decision unit outputs a bus use request signal to the network bus to request use of the network bus, and in case where a bus use permission signal is input from the network bus, the decision unit determines that the network bus is available.

9. The packet transmission system according to claim 7, wherein the CPU reads out the first packet from the memory apparatus, and passes the first packet to the packet reception unit.

10. The packet transmission system according to claim 7, wherein the packet reception unit reads out the first packet from the memory apparatus by DMA.

11. The packet transmission system according to claim 7, wherein the packet transmission apparatus further comprises a condition input unit which receives the data sending condition from the CPU and which stores the data sending condition in the condition storage unit.

12. A packet transmission method of generating a packet in a certain device connected to a network bus and sending out the generated packet toward another device, the packet transmission method comprising:

generating a first packet having a first header and contents data;

inputting a data string of the first packet to a buffer from its head successively;

altering a value of a write pointer according to an input of the contents data and altering a value of a read pointer according to an output of the contents data;

calculating a size of contents data that is input to the buffer and that is not yet read out from the buffer by subtracting the value of the read pointer from the value of the write pointer, as a transmittable size;

making a decision whether the network bus is available in case where the transmittable size has reached at least the threshold size;

reading out contents data that is input to the buffer and that is not yet read out from the buffer, in case where the network bus is available;

generating a second header on the basis of a size of the contents data read out and the first header;

adding the second header to the contents data read out to generate a second packet; and outputting the generated second packet to the network bus.

13. The packet transmission method according to claim 12, further comprising:

outputting a bus use request signal to the network bus to request use of the network bus, and determining that the network bus is available, in case where a bus use permission signal is input from the network bus.

* * * * *